(12) United States Patent
Kuwahara

(10) Patent No.: US 8,160,589 B2
(45) Date of Patent: Apr. 17, 2012

(54) BASE STATION EQUIPMENT

(75) Inventor: Mikio Kuwahara, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 441 days.

(21) Appl. No.: 12/359,433

(22) Filed: Jan. 26, 2009

(65) Prior Publication Data

US 2009/0253461 A1 Oct. 8, 2009

(30) Foreign Application Priority Data

Apr. 4, 2008 (JP) ................................ 2008-097709

(51) Int. Cl.
*H04W 36/00* (2009.01)

(52) U.S. Cl. ........ 455/440; 455/438; 455/444; 455/448; 455/432.1; 370/331; 370/252

(58) Field of Classification Search .................. 455/502, 455/436, 438, 432.1, 418, 525, 574; 370/252, 370/331
See application file for complete search history.

(56) References Cited

U.S. PATENT DOCUMENTS

| | | | |
|---|---|---|---|
| 5,175,867 A * | 12/1992 | Wejke et al. .................. 455/439 |
| 6,567,460 B1 | 5/2003 | Tak et al. |
| 8,009,635 B2 * | 8/2011 | Fashandi et al. ............... 370/333 |
| 2002/0177460 A1* | 11/2002 | Beasley et al. ................. 455/502 |
| 2003/0129984 A1 | 7/2003 | Dent |
| 2007/0066273 A1* | 3/2007 | Laroia et al. ............... 455/343.2 |
| 2011/0280219 A1* | 11/2011 | Fashandi et al. ............... 370/331 |

FOREIGN PATENT DOCUMENTS

JP 2007-214819 8/2007
WO WO 2005/062798 7/2005

* cited by examiner

*Primary Examiner* — Nick Corsaro
*Assistant Examiner* — Quan Hua
(74) *Attorney, Agent, or Firm* — Antonelli, Terry, Stout & Kraus, LLP.

(57) ABSTRACT

A base station equipment determines, based on a specified condition, whether or not a wireless terminal exists in the vicinity thereof, and then if it exists in the vicinity, the base station equipment transmits information indicating that the base station equipment is ready to communicate with the wireless terminal.

4 Claims, 9 Drawing Sheets

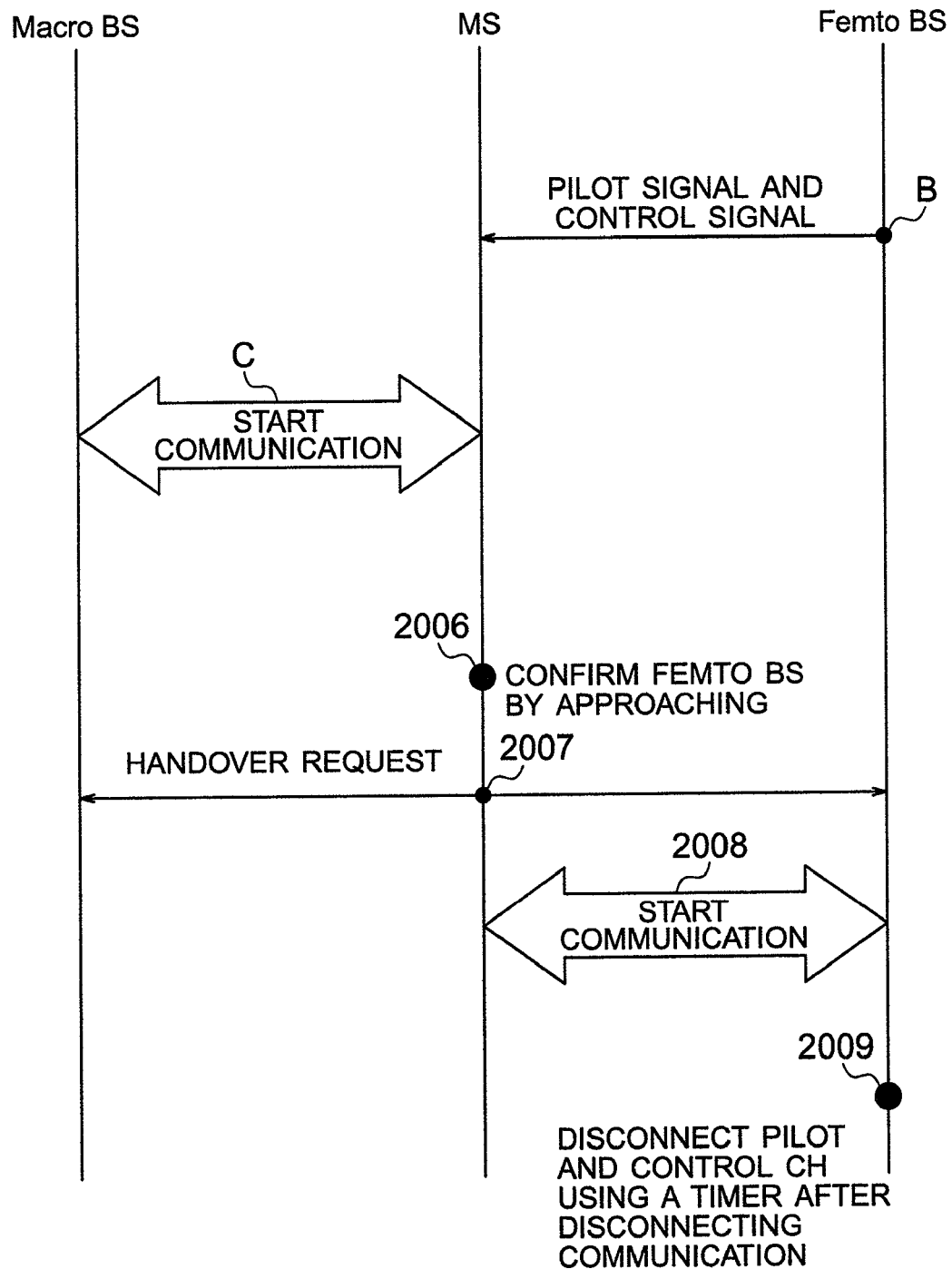

■FORWARD LINK STRUCTURE

■REVERSE LINK STRUCTURE

■FEMTO BS AIR CHECK

BASE STATION EQUIPMENT

INCORPORATION BY REFERENCE

The present application claims priority from Japanese application JP2008-097709 filed on Apr. 4, 2008, the content of which is hereby incorporated by reference into this application.

BACKGROUND OF THE INVENTION

The present invention relates to wireless communication technologies, and in particular, relates to a technology for reducing interference generated in wireless communication.

Wireless communication is communication using radio waves having the property of propagating in space. Since the radio waves are absorbed and reflected by building materials and the like, the electric power of the radio wave which a wireless terminal can receive will be weakened in particular spaces, such as an indoor space. Moreover, the conventional wireless communication system has established, as the base station equipment, macro cell base station equipments (high output power base station equipments with a wide covering area), each of which covers an area of several kilometers in radius, and therefore, in the downlink (Forward Link) for communicating from a base station equipment to a wireless terminal, there is a problem that a sufficient throughput cannot be obtained due to deterioration in the link quality. Moreover, in the uplink (Reverse Link) for communicating from a wireless terminal to a base station equipment, the wireless terminal has to increase the transmission power and communicate, thus resulting in an increase in the power consumption of the wireless terminal.

Then, a system, in which in addition to the macro cell base station equipment, a small-sized femto cell base station equipment (a small output power base station equipment with a narrow covering area) is installed in an indoor area, such as at home, has received attention. In this system, a wireless terminal can advantageously communicate under better radio wave conditions both in the downlink and the uplink by accessing a nearby femto cell base station equipment.

SUMMARY OF THE INVENTION

Interference occurs due to the collision of radio waves in wireless communications, and therefore, if the above-described femto cell base station equipment is newly installed in addition to the conventionally installed macro cell base station equipments, the number of transmitted radio waves will increase and the interference may be likely to occur. Accordingly, some ingenuity is required so as not to cause interference in installing the femto cell base station equipment. However, at what kind of place in a home a user may install the femto cell base station equipment in order to prevent the occurrence of interference has not been specified clearly, and it is therefore difficult to implement the arrangement design or the wireless line design taking into consideration the propagation loss in the macro cell base station equipment, for example. Accordingly, due to the installation of the femto cell base station equipments, a lot of interferences may occur, resulting in failures in wireless communications.

Note that, JP-A-2007-214819 discloses a technique in which, in a plurality of wireless communication systems, one wireless communication terminal in a first wireless communication system does not interfere with other wireless communication terminal in a second wireless communication system while the other wireless communication terminal communicates in the second wireless communication system. However, JP-A-2007-214819 does not take into consideration a wireless communication system employing the femto cell base station equipment.

In order to solve the above-described problem there is provided a base station equipment which determines based on a specified condition whether or not a wireless terminal exists in the vicinity thereof, and which, if it determined that a base station equipment exists in the vicinity, transmits information indicating that the base station equipment is ready to communicate with the wireless terminal.

BRIEF DESCRIPTION OF THE DRAWINGS

FIG. 11 is a sequence diagram showing a link among the femto cell base station equipment, the wireless terminal, and the macro cell base station equipment.

DESCRIPTION OF THE EMBODIMENTS

Figure 1:
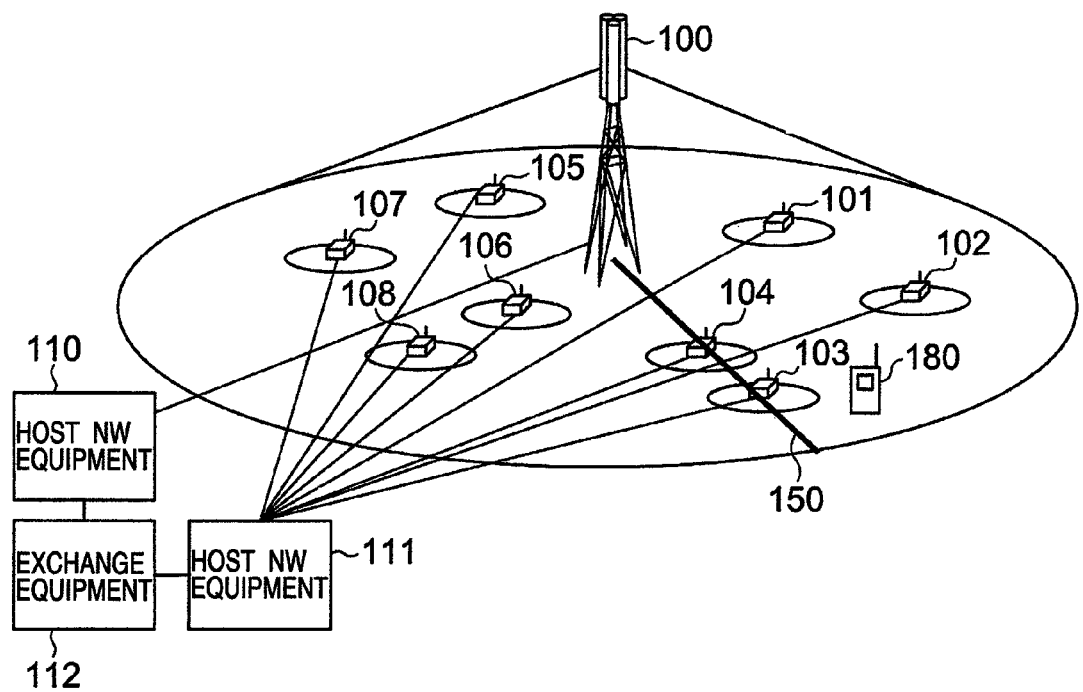
FIG. 1 is a conceptual diagram of a femto cell.

Hereinafter, the examples of a preferred embodiment for implementing the present invention will be described in detail. However, the present invention is not limited to this embodiment. Moreover, in the following, when referring to the base station equipment as the "macro cell base station equipment", it may be simply denoted as the "base station equipment" other than when referred to as the "femto cell base station equipment", however, the "base station equipment" in this case refers to a base station equipment in a broad sense that includes the macro cell base station equipment and the femto cell base station equipment and is provided with a basic capability for communicating with wireless terminals.

Embodiment 1

Usually, a base station equipment confirms that a wireless terminal exists in a range where the wireless terminal can transmit and receive the data of the base station equipment, by receiving a signal transmitted from the wireless terminal. Moreover, the base station equipment transmits a certain signal in order to establish communication with the wireless terminal. For example, a preamble signal for synchronization (also referred to as preamble information), a control signal for providing information on the base station equipment (also referred to as control information), and a paging signal for notifying of a call-in always need to be transmitted. However, in a special environment, i.e., in a home, which is firstly assumed as the installation place of the femto cell, if signals are transmitted only in a particular time zone, which a user uses in one day, it is enough and therefore is not necessary to always transmit some signals.

Accordingly, a femto cell base station equipment with a sleep mode in which no signal is transmitted unless otherwise requested is effective. While the base station equipment is being set in the sleep mode, interference between base station equipments can be temporally dispersed and the interference can be reduced. Here, in this embodiment, for the base station equipment, a state where a signal is transmitted is defined as an active mode (a first mode) and a state where a signal is not transmitted is defined as the sleep mode (a second mode). Moreover, it is also effective to change the setting from the active mode to the sleep mode when communication with a wireless terminal will not be performed for a predetermined period of time. Packet type communications, such as the internet access, are characterized in that once an access is made the communication becomes busy for a particular time period.

For example, in the WEB access, although new WEB pages are sequentially accessed via links, a new packet transmit request is issued after several seconds to several minutes because every time a new WEB page is displayed the contents of this WEB page is read. This sequence, in which each time, a wireless terminal accesses a macro cell once and then hands over to a femto cell, is wasteful and also takes time to response. Then, once a wireless terminal becomes in the communication state, the wireless terminal shall continue in the active mode for a certain period time and afterward transit to the sleep mode. This configuration improves convenience in performing the WEB access or the like, and solves the above-described problem.

First, the overview of the femto cell is described using FIG. 1. FIG. 1 shows that a plurality of femto cells exist within a macro cell. Here, the macro cell refers to an area (represented by a large circle, in FIG. 1) which a high output power base station equipment (hereinafter a macro cell base station equipment 100) covers, and the femto cell refers to an area (represented by a small circle, in FIG. 1) which each of low output power base station equipments (hereinafter, femto cell base station equipments 101-108) covers.

The femto cell, though having a low output power, is intended to establish an environment of an excellent signal quality for a limited space such as an indoor space. Note that, FIG. 1 illustrates a host network equipment 110 connected to the macro cell, a host network equipment 111 connected to the femto cells, and a switching system 112 that links these, as the equipments for constituting a network. Moreover, a wireless terminal 180 exists within the macro cell, and the wireless terminal 180 is basically capable of communicating with the macro cell base station equipment 100. Then, if the wireless terminal 180 enters within a cover area of the femto cell base station equipments 101-108, it can also communicate with the relevant femto cell base station equipment. In communicating with the macro cell base station equipment 100, the wireless terminal 180 will use the host network equipment 110, while in communicating with the femto cell base station equipments 101-108, the wireless terminal 180 will use the host network equipment 111.

Figure 2:
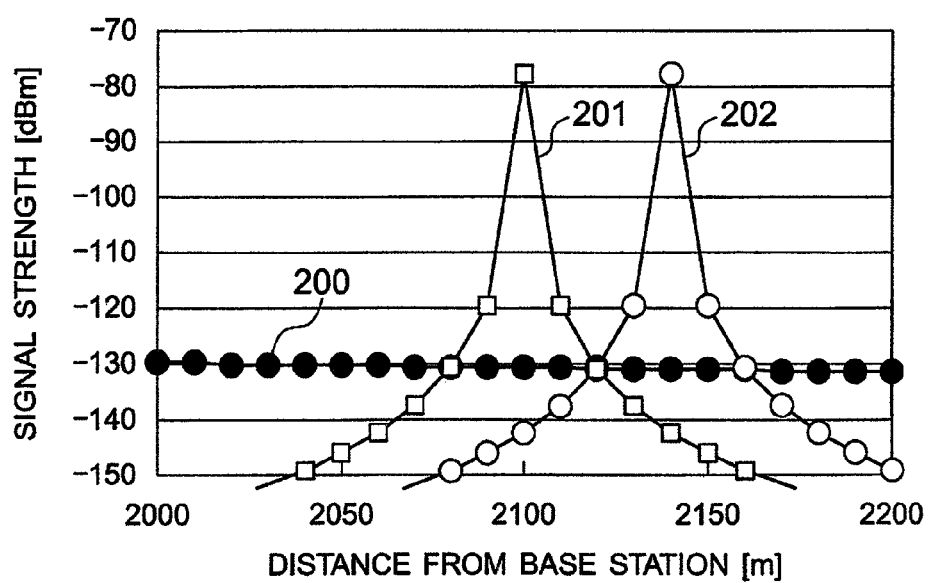
FIG. 2 is a graph showing power values of signals from a macro cell base station equipment and a femto cell base station equipment, respectively.

FIG. 2 shows the signal powers from the macro cell base station equipment and the femto cell base station equipment, respectively. Here, the power value of signals from the two femto cell base station equipments 103 and 104 arranged on the cross section along a straight line 150 in FIG. 1 and the power value of a signal from the macro cell can be displayed together for comparison. A curve 200 shows the power value of a signal from the macro cell base station equipment 100, a curve 201 shows the power value of a signal from the femto cell base station equipment 4, and a curve 202 shows the power value of a signal from the femto cell base station equipment 103. Here, it is assumed that the femto cell base station equipment 104 is installed at a point 2100 m away from the macro cell base station equipment 100, and the femto cell base station equipment 103 is installed at a point 2140 m away from the macro cell base station equipment 100. FIG. 2 shows that the signal power value rises specifically only around the points where the femto cell base station equipments are installed. Accordingly, it can be seen that installation of the femto cell base station equipment can improve the reception quality for a particular area.

Figure 3:
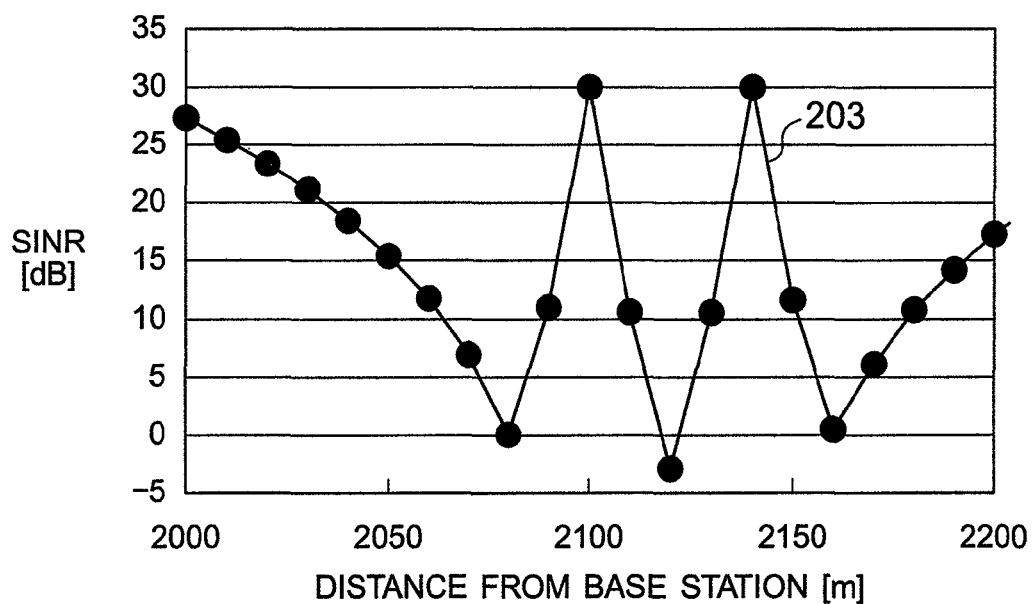
FIG. 3 is a graph showing Signal Interference Noise Power Ratio from a macro cell base station equipment and a femto cell base station equipment, respectively.

FIG. 3 shows Signal Interference Noise Ratio (SINR) from the macro cell base station equipment and the femto cell base station equipment, respectively. Here, the SINR is shown by regarding the signals from other base station equipments as the interference. SINR is expressed with the [power value of a signal showing a larger value/power value of a signal showing a smaller value (interference)] at each point. Accordingly, the higher the SINR, the more stable the communication between the wireless terminal and the base station equipment becomes. From FIG. 3, it can be confirmed that the SINR rises to a high value at the periphery of the points where the femto cell base station equipments are installed (at the points whose distances from the base station are 2100 m and 2140 m, respectively), however, on the periphery thereof there are boundary areas with the macro cell, where the SINR deteriorates. The prior arts incorporate a technique of reducing the interference between cells, for example, by dividing the frequency, thereby reducing the interference between cells to a certain extent even if there is such a cell border.

However, as described above, the femto cell base station equipment is supposed to be installed by an end user without a knowledge of radio wave interference, and it is therefore impossible to reliably predict the interference influence. Moreover, not only a communication channel for simply carrying out communication, but including a header portion called a preamble used for synchronization and a control channel for providing control information, become targets to be interfered. Therefore, the interference of the home-use femto cell that may be used only in a particular time zone in one day will always have an influence on other cells. With the installation of a large number of femto cell base station equipments, the interference area may expand and its influence presumably increases although the signal from one femto cell base station equipment is weak.

Figure 4:
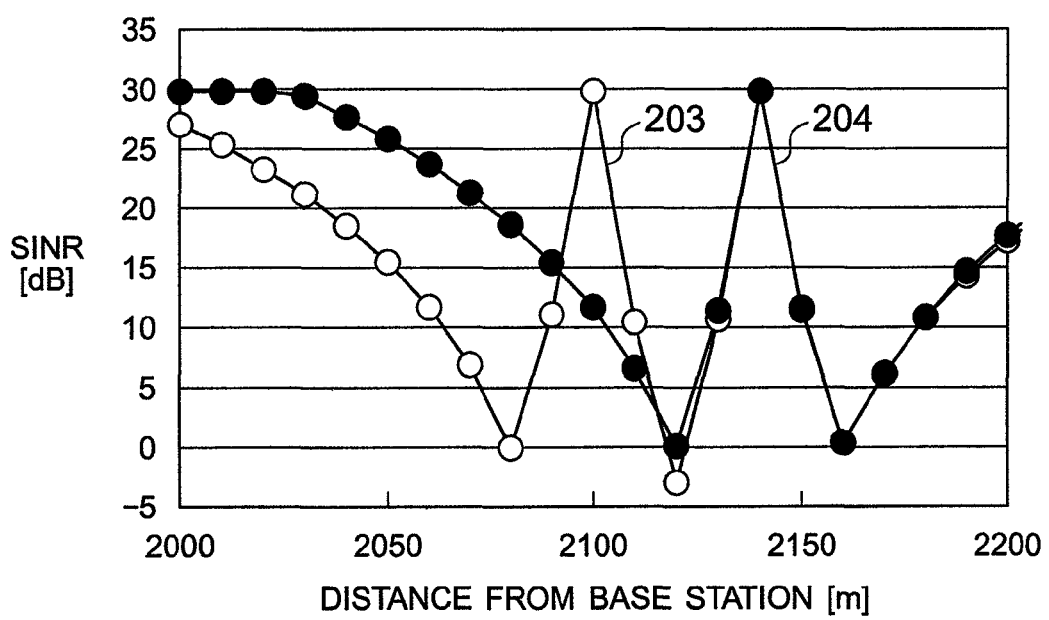
FIG. 4 is a graph showing an effect when the transmission of one femto cell is temporally stopped.

FIG. 4 shows an effect when the transmission of one femto cell is stopped for a certain period of time. A curve 203 shows the SINR when the femto cell base station equipment 103 and the femto cell base station equipment 104 exist, while a curve 204 shows the SINR when only the femto cell base station equipment 103 exists. Here, it can be seen that the SINR has improved significantly with respect to the area whose distance from the macro cell base station equipment 100 is from 2000 to 2100 m. In this way, if a time zone in which the base station equipment does not transmit any signal can be created, the interference with other cells can be reduced significantly. By paying attention to a fact that in the femto cell a user is most likely to utilize only in a particular time zone in one day, and causing a base station equipment to transmit only necessary minimum information at a required time, the interference of the femto cell can be reduced.

Usually, the base station equipment transmits a pilot signal (also referred to as pilot information) required for synchronization with other base station equipment, and a control signal (also referred to as control information) containing information on the base station equipment, via a control channel. On the other hand, a wireless terminal can recognize and access a base station equipment by receiving the control signal. However, if a configuration is employed in which the base station equipment will not transmit any signal so as not to cause interference, a wireless terminal can not recognize the base station equipment to communicate with and therefore cannot access thereto. Then, the femto cell base station equipment of this embodiment resolves this problem by having a function, in which a signal received from a wireless terminal is measured and if the power value of this signal is greater than or equal to a threshold value, the femto cell base station equipment transitions from the sleep mode (mode not to transmit the control signal) to the active mode (mode to transmit the control signal).

Figure 5A:
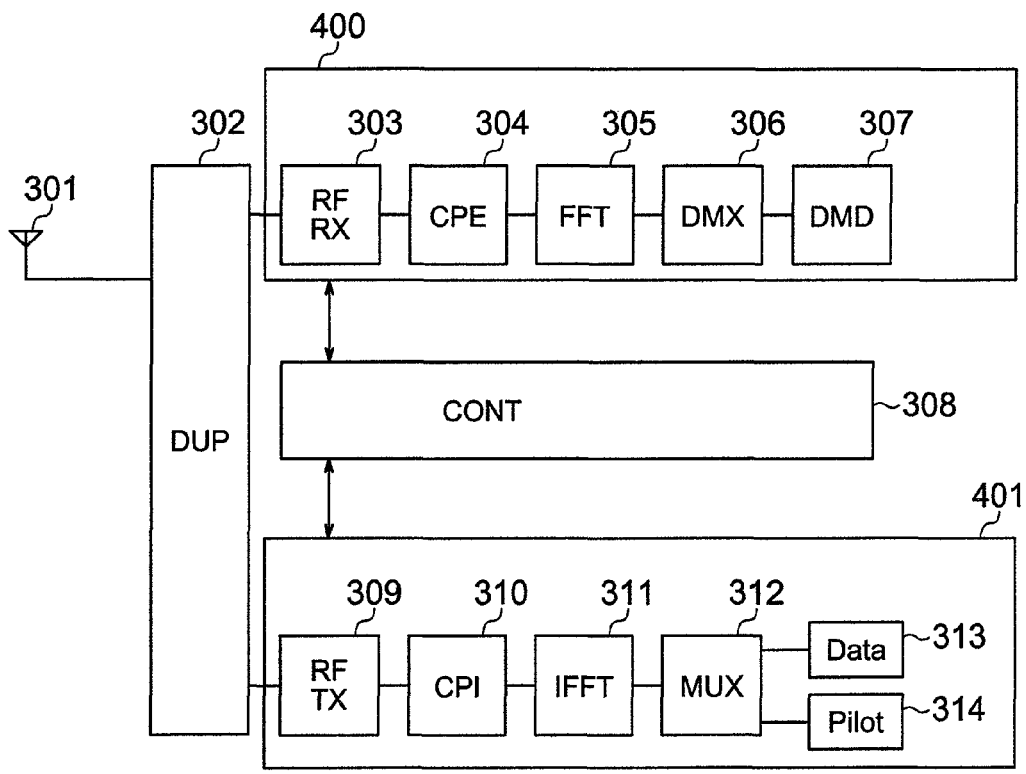
FIGS. 5A and 5B show configuration diagrams of the base station equipment and the wireless terminal, respectively.
Figure 5B:
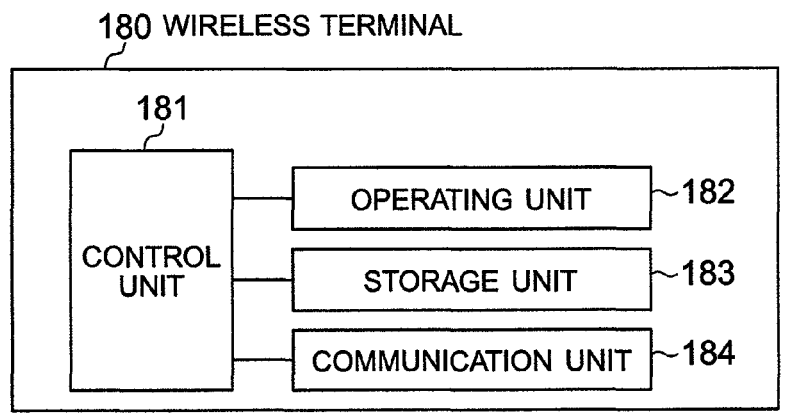

FIGS. 5A and 5B are block diagrams of the femto cell base station equipment and a portable terminal provided with a sleep mode state in which signals including the control channel are not transmitted except when required. In this embodiment, an embodiment of processing an OFDMA signal is described as an example. When the femto cell base station equipment is set in the sleep mode, a transmission system block 401 will not transmit a signal but a receiving system block 400 will receive a signal. A signal coming from an antenna 301 is input to the receiving system block 400 via a duplexer (DUP) 302.

The receiving system block 400 comprises several sub-blocks. First, a signal input from the duplexer 302 is subjected to an appropriate filtering process, down conversion, and AD-conversion in an RF receiver (RFRX) 303 and converted into a digital signal. Thereafter, a CP is eliminated by a CP eliminator (CPE) 304, and a signal processed into an FFT size is extracted. This signal is subjected to an FFT processing by an FFT section (FFT) 305, and converted from a time domain signal to a frequency domain signal. The signal converted into the frequency domain signal is decomposed into functional channels by a demultiplexer (DMX) 306, which are then demodulated by a required baseband processing in a demodulator (DMD) 307.

Through these series of processings, the level of the received signal can be measured. For example, RSSI (Receiver Signal Strength Indicator, also referred to as Field Strength Indicator, i.e., numerized strength of a received radio wave signal) can be measured in the RF receiver 303. For RSSI, a method of measuring the received power by directly converting the received signal into a logarithmic value using a logarithmic amplifier is used. Using this result, the power in a decibel value of the received signal can be found. This result is transmitted to a control unit (CONT) 308, and a comparison with a threshold value is performed in the control unit 308. In the comparison with the threshold value, if a value greater than or equal to the threshold value is received, the state will be moved from the sleep mode to the active mode.

Once the femto cell base station equipment becomes in the active mode, the control unit 308 will activate the transmission system block 401. The signal (including the control signal) to transmit is encoded and generated using an appropriate encoding means by an encoder (Data) 313, and furthermore the pilot signal is generated by a pilot signal generator (Pilot) 314 in parallel with this encoding. The generated control signal and pilot signal are combined in a multiplexer (MUX) 312, and the combined signal is then arranged in a subcarrier at a determined timing. The arranged signal is subjected to an inverse FFT processing in an inverse FFT section (IFFT) 311, and is then converted from the frequency domain signal to the time domain signal. A CP is added to the prepared time domain signal in a CP inserter (CPI) 310. The time domain information added by the CP is subjected to a DA conversion, an up-conversion processing, and a filter processing in an RF transmitter (RFTX) 309, and is completed as an RF transmission signal. This RF signal is transmitted from the antenna 301 to a wireless terminal or the like via the duplexer 302.

In this embodiment, the point is that the femto cell base station equipment measures the level of a received signal in the receiving system block 400, and compares this measured level with a threshold value, and determines whether to activate the transmission system, depending on this result. Note that various methods can be contemplated as the means for measuring the level of a received signal. However, regardless of a method to be employed the means just needs to have the sleep mode and the active mode and switch between the sleep mode and the active mode depending on the level of a received signal.

Moreover, in this embodiment, as the method of measuring the signal level, RSSI is taken as an example, but not necessarily limited thereto. For example, although the description is omitted in the foregoing, in the receiving system block 400 a detection processing is carried out in order to reduce the influences due to the phase rotation or amplitude fluctuation experienced in a propagation path. In this detection processing, the propagation path needs to be estimated. The propagation path estimation is carried out based on the pilot signal or the like which a wireless terminal transmits, and the estimated propagation path has a value related to the receiving level. It is therefore possible to measure the level of a received signal by making use of this result. Specifically, an average received power is calculated by carrying out an average processing to the propagation path concerning the estimated time and frequency, and the threshold decision is made using this value. Moreover, the wireless terminal 180 comprises a control unit 181 for controlling the whole wireless terminal, an operating unit 182 for displaying various menus and receiving the user's operation and the key-input pushed down with fingers, a storage unit 183 for storing various information, and a communication unit (having a data transmission and receipt function and a call function) 184 for communicating with a base station or other wireless terminals.

Figure 6:
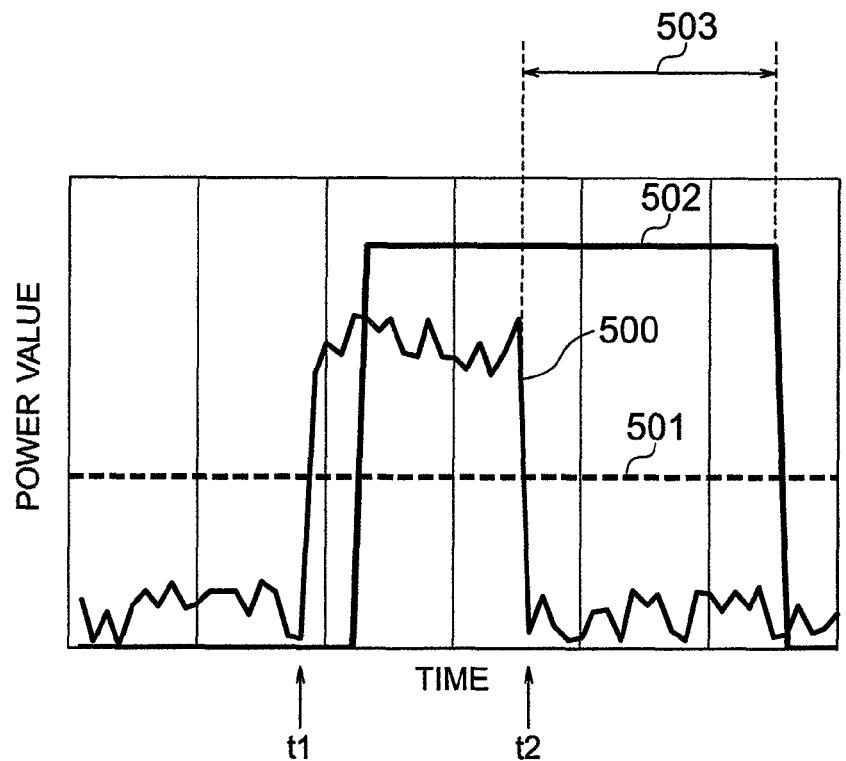
FIG. 6 is a graph of a received signal power, a threshold value, and a transmission power.

FIG. 6 is a view showing a relationship between the received signal power and the output of the transmission system, where the vertical axis represents the power value and the horizontal axis represents time. The value increases upwards on the vertical axis, and time elapses from left to right on the horizontal axis. A curve 500 shows the power value of a signal which a femto cell base station equipment receives via the antenna 301, a dashed line 501 shows a threshold value which the femto cell base station equipment has in advance, and a curve 502 shows the power value of a signal which the femto cell base station equipment transmits.

The femto cell base station equipment receives a signal with a power value smaller than the dashed line 501 until time reaches to t1. Then, upon reaching t1, the power value of the received signal abruptly increases and exceeds the threshold value. At this instance, the control unit 308 of the femto cell base station equipment issues an instruction to activate the transmission system block 401. Based on the instruction from the control unit 308, the transmission system block 401 is activated, and starts to transmit a signal as shown by the curve 502.

Subsequently, when time reaches to t2, the power of the received signal abruptly decreases. Although the femto cell base station equipment detects that the power of the signal received by the receiving system block 400 is below the threshold value, it will not reduce the power value of the signal to transmit, along with this detection, but will maintain the power value until a certain time 503 elapses. This configuration can correspond also to the characteristic of data communication, such as access to the WEB, in which once data transmission is started the transmission is likely to be continued intermittently. For example, if the power value of a transmission signal by the transmission system block 401 is reduced to transition to the sleep mode, then in transmitting the signal again it will take time to switch from the sleep mode to the active mode and thus a delay will occur in the activation, however, the above-described configuration can prevent this delay. Note that, as the basic configuration, no signal shall be transmitted in the sleep mode (i.e., the power value of the transmission signal is set to 0), however, even if a configuration is employed in which such a small signal that will not increase interference is transmitted (i.e., the power value of a transmission signal is maintained at a certain value instead of at 0), a certain degree of effect can be obtained.

Figure 8:
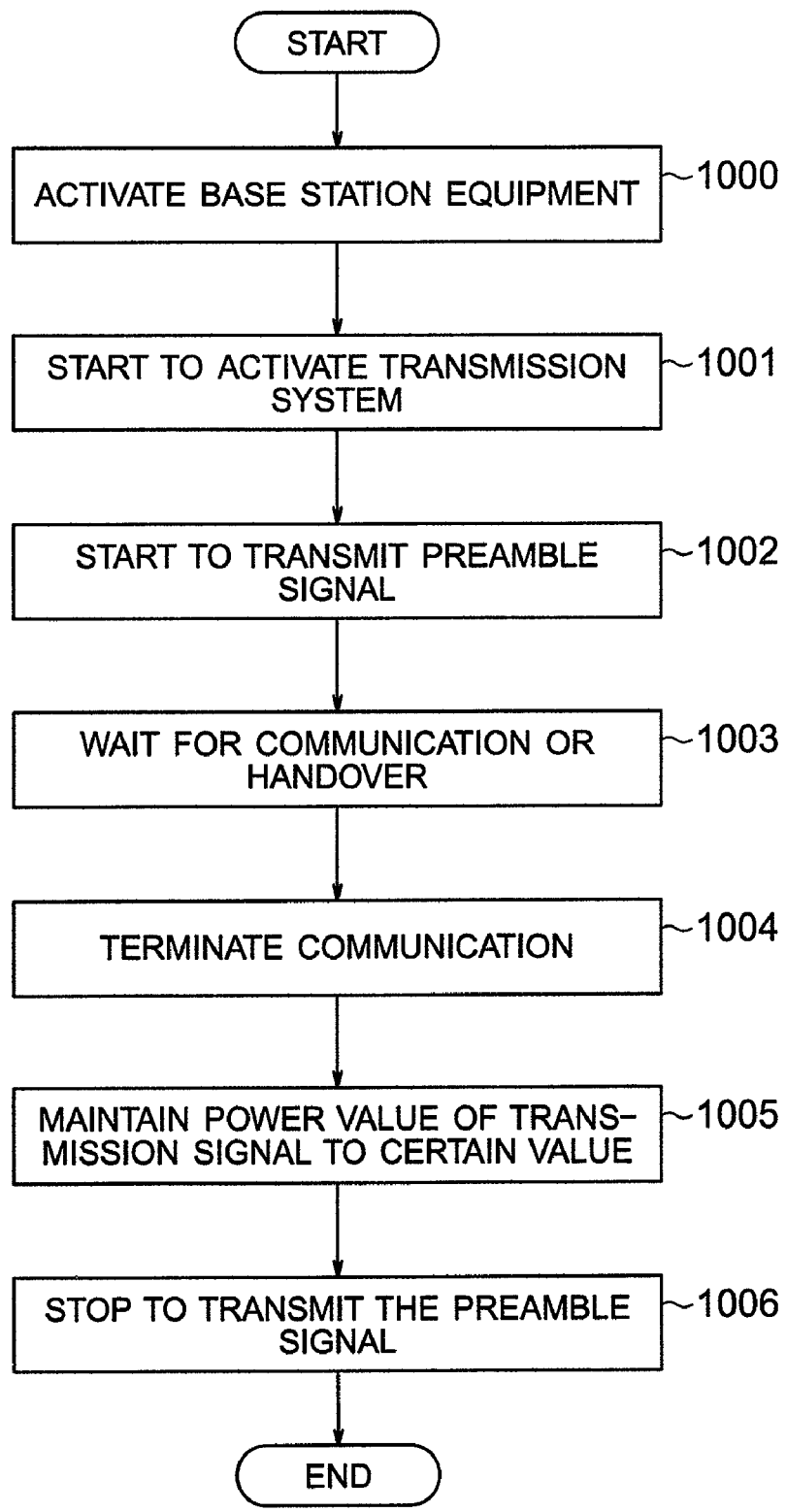
FIG. 8 is a flowchart of the femto cell base station equipment.

FIG. 8 is a flowchart showing the operation flow of the femto cell base station equipment. When activated, the femto cell base station equipment will activate the receiving system block 401, and set the mode to the sleep mode, and wait for a signal from a wireless terminal (Step 1000). When the femto cell base station equipment recognizes, based on the threshold decision of a received signal, the receipt of a signal, it starts to activate the transmission system (Step 1001). First, the preamble signal (a transmission signal containing the pilot signal and the control signal) is transmitted (Step 1002).

Then, the femto cell base station equipment waits for a communication request or a handover request from a wireless terminal (Step 1003). If there is the request from the wireless terminal, the base station equipment will be in a communication state accordingly. Upon completion of the communication (Step 1004), the power value of the signal to transmit will be maintained at a value greater than or equal to a certain value (also referred to as being maintained in a hysterisis state) (Step 1005), and the preamble transmission is stopped and the mode transitions to the sleep mode (Step 1006). If there is the next communication request while the power value of the signal to transmit is maintained at a value greater than or equal to a certain value in Step 1005, then the mode transitions to the communication state again.

Figure 9:
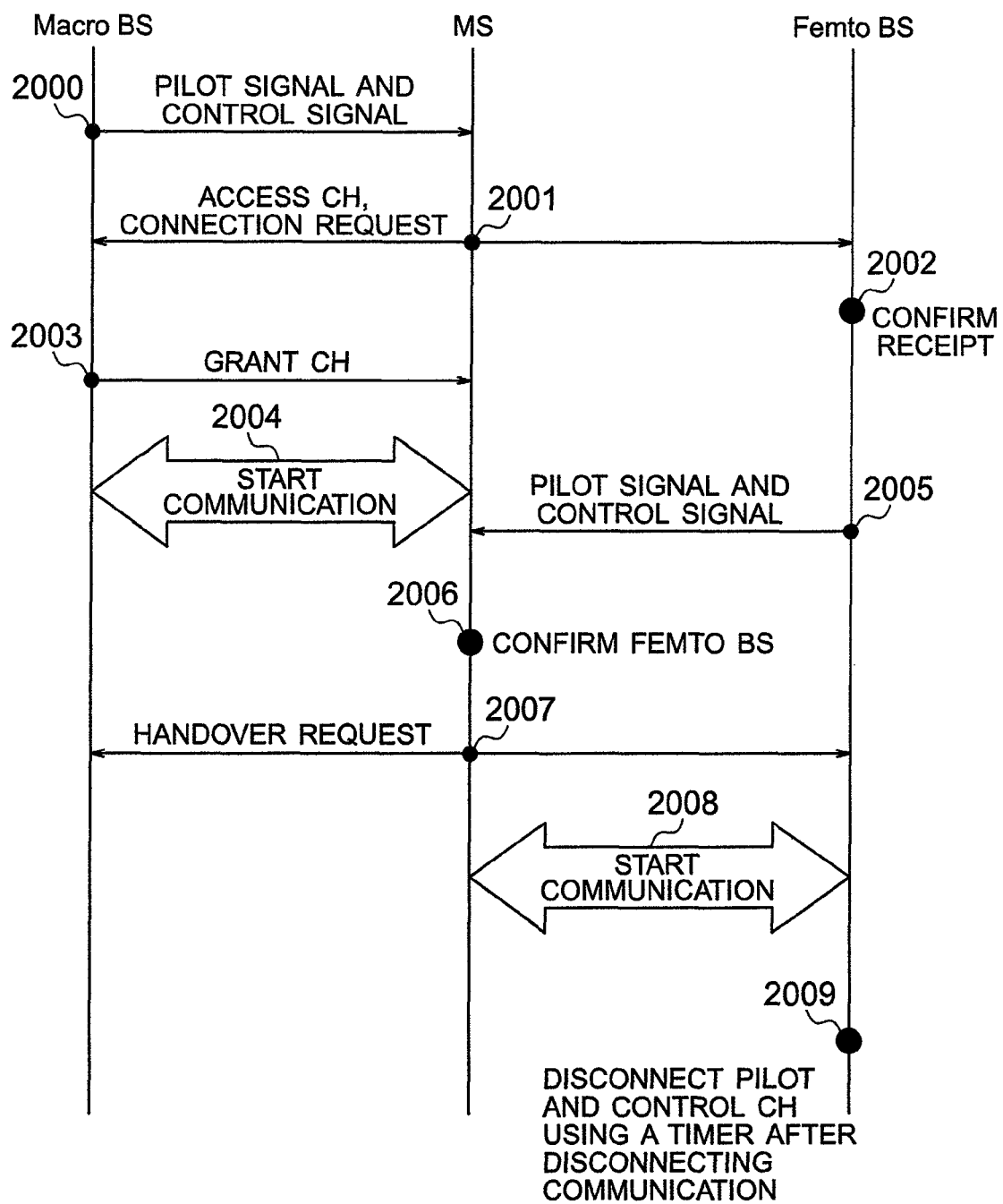
FIG. 9 is a sequence diagram showing a link among the femto cell base station equipment, the wireless terminal, and the macro cell base station equipment.

FIG. 9 is a sequence diagram showing a flow including the macro cell base station equipment and the wireless terminal. The macro cell base station equipment is always set to the active state, and the wireless terminals within an area (macro cell) which the macro cell base station equipment covers are under the macro cell's control.

The macro cell base station equipment transmits the pilot signal and the control channel to the wireless terminal, and the wireless terminal is receiving these information at least intermittently (Step 2000). Upon being paged, the wireless terminal transmits a connection request signal (access channel) to the macro cell base station equipment to request for connection (Step 2001).

Upon receipt of the connection request signal, the macro cell base station equipment transmits to the wireless terminal an acknowledge signal (grant channel) notifying of approval for the connection request (Step 2003). As a result, the communication between the macro cell base station equipment and the wireless terminal is established (Step 2004). In Step 2004, the wireless terminal 180 of FIG. 1 communicates with the macro cell base station equipment 100 via the communication unit 184, and carries out a voice call or data communication by connecting to the network using the host network equipment 110.

On the other hand, if a femto cell base station equipment exists in the vicinity of the wireless terminal and a femto cell is formed, the femto cell base station equipment also can receive the connection request signal. Upon receipt of the connection request signal, the femto cell base station equipment determines whether or not the power value of this signal is higher than a predefined threshold value (Step 2002). Here, after confirming that the power of the received signal is higher than the threshold value (confirming that the wireless terminal exists in the vicinity of the femto cell base station equipment), the femto cell base station equipment transmits the pilot signal and the control signal to the wireless terminal to notify that the femto cell base station equipment exists in the vicinity of the wireless terminal (Step 2005). The femto cell base station equipment can transmit to the wireless terminal 180 information notifying that the femto cell base station equipment exists in the vicinity of the wireless terminal, and also can transmit an instruction to change the connection destination from the macro cell base station equipment to the femto cell base station equipment.

The wireless terminal receives the pilot signal and the control signal from the femto cell base station equipment and confirms that the wireless terminal exists within the femto cell (Step 2006). Then, the wireless terminal requests the macro cell base station equipment and the femto cell base station equipment for handover (Step 2007). Upon completion of this handover procedure, the communication between the wireless terminal and the femto cell base station equipment is started (Step 2008). In Step 2008, in a state where the wireless terminal 180 of FIG. 1 moves within the cover area of the femto cell base station equipment 103, for example, the wireless terminal 180 communicates with the femto cell base station equipment 103 via the communication unit 184, and carries out a voice call or data communication by connecting to the network using the host network equipment 111.

Upon completion of the communication, a timer is activated, and if new communication is not started even after a certain period of time, the femto cell base station equipment will stop to transmit the pilot signal and the control signal (Step 2009). This enables the operation of the femto cell base station equipment that transmits the pilot signal and the control signal only in a required time zone, thereby reducing the occurrence of interference that has been the problem. In the foregoing, as described in FIG. 6, a method of instantaneously increasing the output power when the power value of a received signal exceeds a determined threshold value has been described, however, since an interference area will occur around a femto cell as shown in FIG. 3, the influence from the increased output power is preferably gradual. Therefore, as shown in FIG. 7, as the method of increasing the transmission power, a method of gradually increasing the power value may be contemplated.

Figure 7:
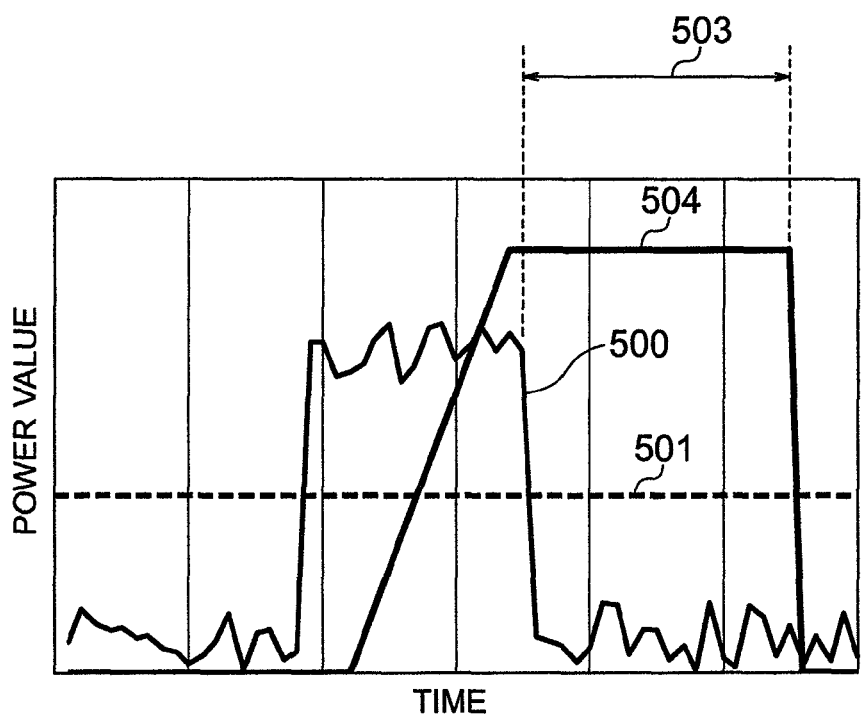
FIG. 7 is a graph of a received signal power, a threshold value, and a transmission power.
Figure 10:
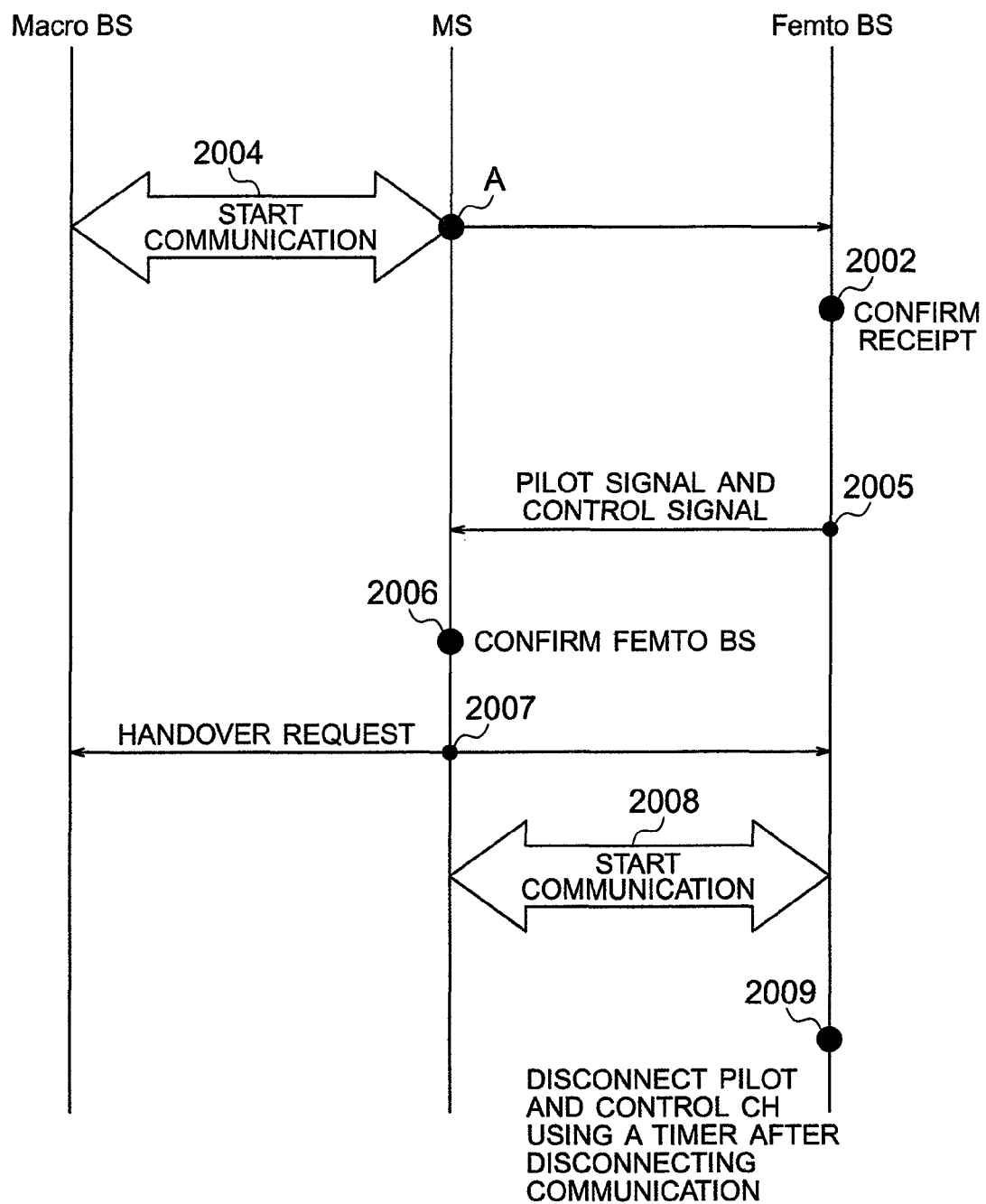
FIG. 10 is a sequence diagram showing a link among the femto cell base station equipment, the wireless terminal, and the macro cell base station equipment.

A curve 504 of FIG. 7 shows the power value of a signal which the femto cell base station equipment transmits, and the power value is increased more gradually than the curve 502 in the FIG. 6. Moreover, in the foregoing, an example has been described in which upon being paged a wireless terminal within the range of a femto cell issues a new call request, but not limited thereto. For example, as shown in FIG. 10, the present invention is applicable also in the case where even if a wireless terminal is already communicating with a macro cell base station equipment, this wireless terminal enters in the range of a femto cell and its power value exceeds the threshold value of a received signal. In this case, during communication, the femto cell base station equipment detects a signal transmitted from the wireless terminal to activate the transmission system block 401.

Moreover, in FIG. 9 an embodiment has been described in which the wireless terminal is connected to the femto cell base station equipment after being connected to the macro cell base station equipment, however, the wireless terminal may be connected to the femto cell base station equipment before being connected to the macro cell base station equipment. For example, this is a case where the wireless terminal receives a signal from the femto cell base station equipment earlier than the acknowledge signal from the macro cell base station equipment. In this case, Step 2003 and Step 2004 will be skipped.

In FIG. 10, Step A is newly inserted in the flow of FIG. 9. Step A is for transmitting a signal when the wireless terminal is in communication. After Step A, the femto cell base station equipment determines whether or not the power value of the signal is higher than a predefined threshold value (Step 2002). Other steps are the same as those of FIG. 9.

Moreover, as shown in FIG. 11, the present invention is also applicable to a case where while a femto cell is already in the active state and is transmitting the pilot signal and the control information, a wireless terminal in communication enters into a communicable area of the wireless terminal and thereby hands over to the femto cell. In FIG. 11, after the femto cell base station equipment transmits the pilot signal and the control signal in Step B, the communication is started in Step C. Thereafter, the wireless terminal receives the pilot signal and the control signal from the femto cell base station equipment, and recognizes that the wireless terminal exists within the femto cell (Step 2006). Other steps are the same as those of FIG. 9.

Embodiment 2

The base station equipment is preferably in frame synchronization with the system in order to avoid interference with other base station equipment. That is, when a wireless terminal communicates with a femto cell base station equipment, it is preferable that the wireless terminal can receive data without a delay as compared with the case of communicating with a macro cell base station equipment. Then, the femto cell base station equipment needs to synchronize with the macro cell base station equipment. For synchronization between base station equipments, an approach of using a GPS is known, however, it is difficult to mount the GPS in the base station equipment, such as the femto cell, that is required to be inexpensive. Then, a method of achieving system synchronization using a signal transmitted from other macro cell base station equipment is effective.

Figure 12A:
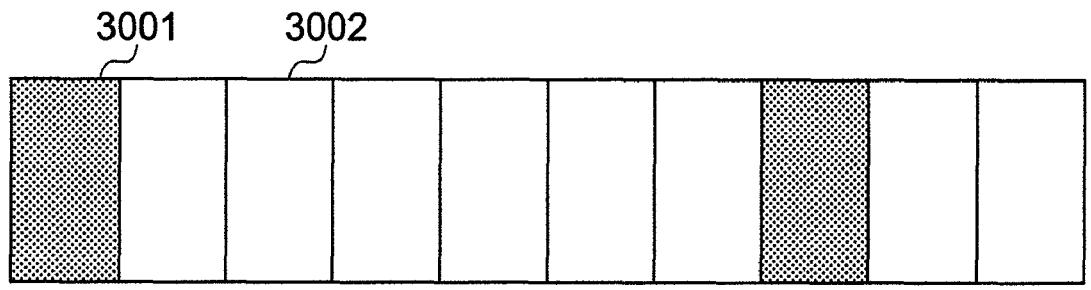
FIGS. 12A-12C are views showing a method for the femto cell base station equipment to monitor received signals.
Figure 12B:
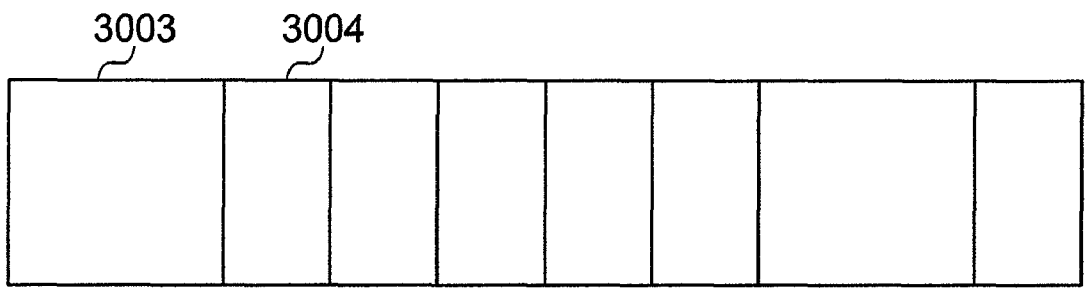
Figure 12C:
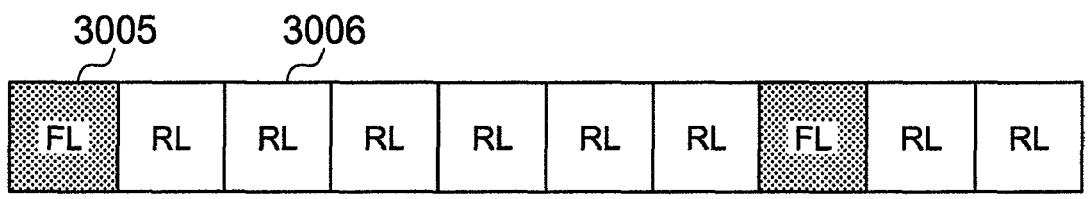

FIGS. 12A-12C show an example of the frame format of an OFDMA system. In the downlink (Forward Link), a top subframe 3001 indicated by hatching is arranged at the top of the frame. This subframe comprises a known symbol pattern called a preamble and the control information. The wireless terminal synchronizes with the system and acquires the information about paging or the like by intermittently receiving this preamble. The subframes following the preamble are provided in the unit of carrying signals for the communication channel. Since the frame configuration of the uplink (Reverse Link) corresponding thereto does not require a portion corresponding to the preamble, all the frames serve as the frames for carrying signals for the communication channel. For example, in a UMB system standardized by 3GPP2, for a frame corresponding to the top subframe 3001 among the uplink subframes, a subframe 3003 is set longer than an ordinary frame 3004 so that the uplink and downlink subframes may correspond to each other. The subframe 3003 comprises ACK and the like indicative of a reply indicative of the receipt of data destined for the subframe 3001.

Then, in a system represented by UMB having the above-described configuration, an air check (confirmation whether or not it has received a signal) of the femto cell is carried out as in FIG. 12C. The control unit 308 of the femto cell base station equipment stores in advance a time zone in which the macro cell base station equipment transmits the preamble. Then, in this time zone, the target to be received is set to FL (Forward Link) 3005, and a signal (signal transmitted from a macro cell base station equipment) of the downlink frequency is monitored and the synchronization with the adjacent macro cell base station equipment is maintained.

Then, in other time zones, the target to be received is set to RL (Reverse Link) 3006, and a signal (signal transmitted from a wireless terminal) of the uplink frequency is monitored, and then, if it is in the sleep mode, the threshold decision whether or not to become in the active mode is carried out. If it is already in the active mode, the determination whether or not to transition to the sleep mode is made or the receive processing of a signal from a currently connected wireless terminal is carried out. In this way, the femto cell base station equipment in this embodiment is characterized in that the resource indicated by the subframe 3003 is not assigned to a lower wireless terminal. This enables to monitor, even during communication, the preamble which other base station equipment (macro cell base station equipment) transmits, thereby maintaining the synchronization.

Moreover, with regard to this feature, the femto cell base station equipment may determine to receive which of a signal from a wireless terminal and a signal from a base station equipment (determine the schedule of receiving which of the signals), based on a timing at which the signal is transmitted from other base station equipment. Moreover, with regard to this feature, in the time zone in which a signal is transmitted from other base station equipment, the femto cell base station equipment may preferentially receive a signal from a wireless terminal as compared with a signal from a base station equipment.

Note that, the femto cell base station equipment can freely change the settings about whether to receive a signal from a wireless terminal or to receive a signal from a macro cell base station equipment, for example, by changing the frequency to monitor. Moreover, the femto cell base station equipment can configure the setting to facilitate separation of a signal transmitted by itself from a signal coming from a macro cell base station equipment, for example, by changing the frequency of the preamble to monitor and the frequency at which the femto cell base station equipment transmits the preamble.

Moreover, the femto cell base station equipment can configure the setting to facilitate separation of a signal transmitted by itself from a signal coming from a macro cell base station equipment, for example, by changing the transmission time of the preamble to monitor and the transmission time of the preamble of the femto cell base station equipment. This also includes the actions for the femto cell base station equipment to suspend transmission of the preamble at a timing to normally transmit the preamble, and then monitor the preamble of a macro cell at this suspended timing.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A base station equipment that communicates with a wireless terminal, comprising:
   a timer;
   a transmitter that transmits information indicating that the base station equipment is ready to communicate with the wireless terminal;
   a receiver for receiving a signal; and
   a control unit which:
   determines whether or not a power value of a signal transmitted from the wireless terminal to other base station equipment different from the base station equipment, but received from the wireless terminal via the receiver, is greater than a predetermined threshold value;
   controls the receiver and the transmitter so as to transfer between a sleep mode where the transmitter stops operation and the receiver operates and an active mode where both of the transmitter and the receiver operate;
   judges that the wireless terminal exists near the base station and switches to the active mode when the amount of power of the signal which is transmitted from the wireless terminal to other base station equipment different from the base station equipment, is larger than the predetermined threshold value;
   starts transmission of a control signal from the transmitter to provoke communication with the wireless terminal, and operates the timer; and
   stops the control signal transmitted from the transmitter when communication is not started even after a predetermined period of time.

2. The base station equipment according to claim 1, wherein the control unit executes a system synchronization based on a preamble signal which the control unit received from the other base station equipment different from the base station equipment;
   stores in advance a time zone at which the preamble signal is transmitted from the other base station equipment;
   sets a signal transmitted from the other base station equipment as receiving subject in the time zone; and
   sets a signal transmitted from the wireless terminal as receiving subject in an other time zone different from the time zone.

3. A base station equipment that communicates with a wireless terminal, comprising:
   a receiving system block, a transmission system block, a timer and a control unit, wherein:
   the control unit controls the receiving system block and the transmission system block so as to transfer between a sleep mode where the transmission system block stops operation and the receiving system block operates and an active mode where both of the transmission system block and the receiving system block operate;
   compares an amount of power of a signal with a predetermined threshold value when the receiving system block receives the amount of power of the signal which is transmitted from the wireless terminal to other base station equipment different from the base station equipment;
   judging that the wireless terminal exists near the base station and switches to the active mode when the amount of power of the signal which is transmitted from the wireless terminal to other base station equipment different from the base station equipment is larger than the predetermined threshold value;
   starts transmission of a control signal from the transmission system block and operates the timer; and
   stops the control signal transmitted from the transmission system block when communication does not be started even after a predetermined period of time.

4. The base station equipment according to claim 3, wherein the control unit executes a system synchronization based on a preamble signal which the control unit received from the other base station equipment different from the base station equipment;
   stores in advance a time zone at which the preamble signal is transmitted from the other base station equipment;
   sets a signal transmitted from the other base station equipment as receiving subject in the time zone; and
   sets a signal transmitted from the wireless terminal as receiving subject in an other time zone different from the time zone.

* * * * *